US012560208B2

(12) United States Patent
Piazza

(10) Patent No.: US 12,560,208 B2
(45) Date of Patent: Feb. 24, 2026

(54) GEARBOX ASSEMBLY HAVING A GEAR BRAKE SYSTEM

(71) Applicant: GE Avio S.r.l., Rivalta di Turin (IT)

(72) Inventor: Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/825,423

(22) Filed: Sep. 5, 2024

(65) Prior Publication Data

US 2025/0257770 A1     Aug. 14, 2025

(30) Foreign Application Priority Data

Feb. 8, 2024     (IT) ........................ 102024000002647

(51) Int. Cl.
| | |
|---|---|
| *F16H 57/10* | (2006.01) |
| *F16D 51/14* | (2006.01) |
| *F16D 59/00* | (2006.01) |
| *F02C 7/36* | (2006.01) |
| *F16D 55/34* | (2006.01) |
| *F16D 121/02* | (2012.01) |
| *F16H 35/00* | (2006.01) |

(52) U.S. Cl.
CPC ............. *F16D 51/14* (2013.01); *F16D 59/00* (2013.01); *F02C 7/36* (2013.01); *F16D 55/34* (2013.01); *F16D 2121/02* (2013.01); *F16H 2035/005* (2013.01); *F16H 57/10* (2013.01)

(58) Field of Classification Search
CPC .......... F16D 51/14; F16D 55/34; F16D 59/00; F16D 2121/02; F16H 235/005; F16H 57/10
See application file for complete search history.

(56) References Cited

U.S. PATENT DOCUMENTS

| | | | | |
|---|---|---|---|---|
| 2,028,629 | A | * | 1/1936 | Smith ........................ F16B 1/04 192/54.5 |
| 3,033,394 | A | * | 5/1962 | Kashergen ................ E02F 5/18 37/234 |
| 3,302,759 | A | * | 2/1967 | Nydam ..................... F16H 1/02 188/82.1 |
| 3,667,578 | A | * | 6/1972 | Johnson ................. H02K 7/102 192/223.3 |
| 5,308,154 | A | * | 5/1994 | Matouka ............... B60T 8/4266 192/12 BA |
| 5,334,061 | A | | 8/1994 | Behm et al. |

(Continued)

FOREIGN PATENT DOCUMENTS

| | | |
|---|---|---|
| DE | 4413854 A1 | 10/1995 |
| FR | 3127024 A1 | 3/2023 |

(Continued)

*Primary Examiner* — William C Joyce
(74) *Attorney, Agent, or Firm* — Venable LLP; Michele V. Frank

(57) ABSTRACT

A gearbox assembly including a gear assembly, an input shaft, an output shaft, and a gear brake system. The input shaft is coupled to the gear assembly. The output shaft is drivingly coupled to the input shaft through the gear assembly. The gear brake system is disposed within the gear assembly, and includes one or more brake devices. The gear brake system actuates the one or more brake devices to brake the gear assembly during a reverse torque condition of the gearbox assembly.

20 Claims, 4 Drawing Sheets

(56) References Cited

U.S. PATENT DOCUMENTS

| | | | |
|---|---|---|---|
| 5,845,483 | A | 12/1998 | Petrowicz |
| 6,672,049 | B2 | 1/2004 | Franchet et al. |
| 7,621,117 | B2 | 11/2009 | Dooley et al. |
| 7,805,947 | B2 | 10/2010 | Moulebhar |
| 7,849,668 | B2 | 12/2010 | Sheridan |
| 8,657,714 | B1 | 2/2014 | Ghanime et al. |
| 10,337,349 | B2 | 7/2019 | Roberge |
| 10,526,913 | B2 | 1/2020 | Roberge |
| 11,092,037 | B2 | 8/2021 | Valva et al. |
| 2009/0121568 | A1 * | 5/2009 | Acosta .................... F16H 1/203 |
| | | | 310/249 |
| 2017/0234217 | A1 | 8/2017 | Wotzak et al. |

FOREIGN PATENT DOCUMENTS

| | | | |
|---|---|---|---|
| FR | 3127025 | A1 | 3/2023 |
| FR | 3129436 | A1 | 5/2023 |
| FR | 3129690 | A1 | 6/2023 |
| FR | 3130747 | A1 | 6/2023 |
| FR | 3130875 | A1 | 6/2023 |
| WO | 2011145388 | A1 | 11/2011 |

* cited by examiner

GEARBOX ASSEMBLY HAVING A GEAR BRAKE SYSTEM

CROSS REFERENCE TO RELATED APPLICATIONS

The present application claims the benefit of Italian Patent Application No. 102024000002647, filed on Feb. 8, 2024, which is hereby incorporated by reference herein in its entirety.

TECHNICAL FIELD

The present disclosure relates generally to gearbox assemblies, and, particularly, to gear brake systems for gearbox assemblies.

BACKGROUND

Gearbox assemblies, such as gearbox assemblies for vehicles, transfer torque from an input shaft to an output shaft. Such vehicles can include turbine engines that generally include a propulsor (e.g., a fan or a propeller) and a turbo-engine (e.g., a compressor section, a combustion section, and a turbine section) arranged in flow communication with one another. The gearbox assembly in a turbine engine transfers torque and power from the turbo-engine to the propulsor.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
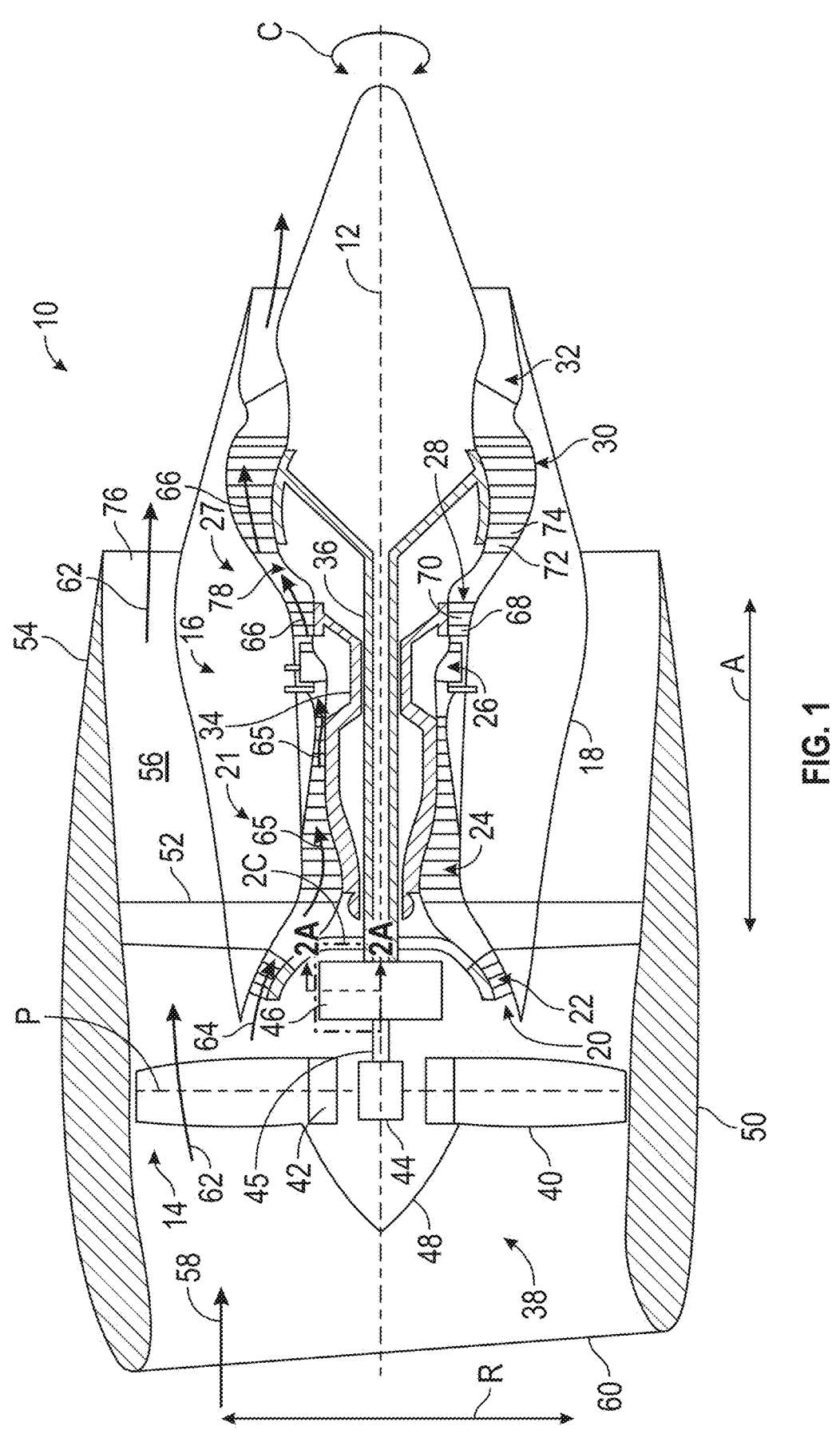
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the turbo-engine such that rotation of the components of the turbo-engine causes the propulsor to rotate and to generate thrust. A propulsor can include a fan or a propeller. In turbofan engines (ducted fan engines or unducted fan engines), the propulsor is a fan. In turboprop engines, the propulsor is a propeller.

As used herein, "stiff" or "stiffness" is the extent that an object resists deformation in response to an applied force on the object. The more stiff an object is (e.g., greater stiffness), the less flexible the object is and the more the object resists deformation in response to the applied force on the object (e.g., the object does not bend or deform under the applied force). Likewise, the less stiff an object is (e.g., lesser stiffness), the more flexible the object is and the less the object resists deformation in response to the applied force on the object (e.g., the object bends or deforms under the applied force).

As used herein, "normal operation" of a gearbox assembly, a turbine engine, or a vehicle is intended to mean when the gearbox assembly, the turbine engine, or the vehicle is operating, and torque is transferred from an input shaft to an output shaft through a gear assembly of the gearbox assembly in an operational torque direction. This causes the output shaft to rotate in an operational rotational direction. In the case of a turbine engine, the torque is transferred from the turbo-engine (e.g., via a low-pressure shaft) to the propulsor (e.g., via a propulsor shaft) through the gear assembly during the normal operation of the turbine engine.

As used herein, a "reverse torque condition" is when the torque through the gear assembly changes from the operational torque direction. In one example, the reverse torque condition occurs when torque is transferred from the output shaft to the input shaft through the gear assembly in a reverse torque direction that is opposite the operational torque direction. In another example, the reverse torque condition occurs when the output shaft is operating in the operational rotational direction, and the torque is transferred from the output shaft through the gear assembly causing the output shaft to decelerate. The reverse torque condition can occur when the gearbox assembly, the turbine engine, or the vehicle is operating or is shut down. In the case of a turbine engine, the reverse torque condition can occur when the propulsor is windmilling and causing the propulsor shaft to rotate, thereby rotating the gears of the gearbox assembly.

As used herein, "windmill" or "windmilling" is a condition when the propulsor and the low-pressure shaft of the turbine engine continue to rotate at low speeds, while the high-pressure shaft rotates slowly or even stops. Windmilling can occur when the turbine engine is shut down, but air still flows across the propulsor, such as during an in-flight engine shutdown or when the turbine engine is on the ground and the propulsor is rotating in the presence of wind when the turbine engine is shut down. During windmilling, torque is transferred from the propulsor (e.g., via the propulsor shaft) to the turbo-engine (e.g., via the low-pressure shaft) through the gear assembly, therefore the forces (e.g., the torques) are oriented in a direction that is opposite to the operational torque direction.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a gearbox assembly for a vehicle, having one or more bearings therein. In operation, the gearbox assembly transfers torque from an input shaft to an output shaft through the gear assembly. In one embodiment, the gearbox assembly is for a turbine engine, and the input shaft is a low-pressure shaft of a turbo-engine of the turbine engine and the output shaft is a propulsor shaft of the turbine engine. In this way, the turbo-engine transfers torque to the propulsor shaft through the gearbox assembly to rotate a propulsor of the turbine engine.

The bearings allow rotation of one or more gears of the gearbox assembly about the bearings. In one embodiment, one or more of the bearings are journal bearings. The bearings can include any type of bearings, such as, for example, roller bearings, ball bearings, or the like. The bearings, especially, journal bearings, are hydrodynamic bearings that typically require a steady supply of lubricant during all operational phases of the gearbox assembly to properly lubricate the bearings to prevent damage due to sliding contact for hydrodynamic journal bearings or even for the generic gear mesh interface. Typically, a lubrication system supplies the lubricant to the bearings during operation of the gearbox assembly (e.g., while the turbine engine or the vehicle is powered on and operating).

The input shaft or the output shaft of the gearbox assembly may experience long duration, continued rotation following a shutdown of the turbine engine. For example, torque may be transferred from the output shaft to the input shaft in a reverse torque condition when the gearbox assembly is shut down. In one embodiment, this reverse torque condition occurs when the propulsor of the turbine engine is windmilling. In such instances, the bearings can be affected by not receiving enough lubricant for lubricating the bearings. For example, during the reverse torque condition (e.g., windmilling), the rotational speed of the shafts may be too low to power a pump that pumps the lubricant to the bearings. In some instances, e.g., during operation of the vehicle (e.g., when the turbine engine of an aircraft is in-flight), the lubrication system may lose pressure (e.g., due to a failure of the pump or other components of the lubrication system), such that the lubrication system is unable to provide the lubricant to the bearings.

The criticality of the lubricant interruptions increases when the bearings are journal bearings, since the absence of lubricant at the journal bearings can lead to a journal bearing failure and subsequent gearbox failure, which may cause the input shaft (e.g., the low-pressure shaft) to lock up permanently. Such a failure of the journal bearings is referred to as a journal bearing seizure and occurs when there is contact between a pin and a bore of one of the gears of the gear assembly, thereby causing a significant increase of wear and friction that leads to bearing failure. If contact occurs between the journal bearing and the pin during high-power operation, the two components can become welded together due to the high temperature from the friction.

Some gearbox assemblies include an auxiliary lubrication system that includes an auxiliary pump to supply lubricant to the bearings to prevent damage to the bearings due to inadequate lubricant supply during the reverse torque condition. Such auxiliary lubrication systems, however, require added complexity for driving the auxiliary pump. Further, the auxiliary pump requires added complexity to provide the lubricant during high speeds, such as during operation of the gearbox assembly (e.g., of the turbine engine or the vehicle), and during low speeds, such as during the reverse torque condition (e.g., during windmilling). During the reverse torque condition, the propulsor can rotate in a reverse torque rotational direction that is opposite an operational rotational direction of the gearbox assembly. This adds significant complexity to the auxiliary pump as the auxiliary pump needs to operate over a large speed range, and provide a flow of the lubricant regardless of the rotational direction of the output shaft (e.g., of the propulsor).

Accordingly, the present disclosure provides a gear brake system that brakes one or more of the gears of the gear assembly to prevent the gears from rotating, thereby preventing the output shaft (e.g., and the propulsor) from rotating. The gear brake system actuates to brake (e.g., to lock) the gears in response to the reverse torque condition (e.g., the output shaft transfers torque to the input shaft). The gear brake system includes one or more brake devices, such as brake pads, or the like, and a brake fluid reservoir that stores brake fluid therein. The brake fluid reservoir is disposed within at least one of the gears, and, in particular, is disposed within the pin of the gears. The pin includes a variable stiffness such that a first side of the pin has a greater stiffness than a second side of the pin. For example, the first side of the pin is a side that an operational load is applied on the pin (e.g., a load from the gears while the gearbox assembly is operating during normal operation). Thus, the brake fluid reservoir is disposed within the pin on the second side of the pin.

The gear brake system passively actuates the brake devices during the reverse torque condition. For example, the reverse torque condition causes the gears to apply a reverse torque condition load on the second side (rather than the first side). This reverse torque condition load causes the pin to deform at the second side such that the pin squeezes the brake fluid reservoir and forces the brake fluid out of the brake fluid reservoir. The brake fluid actuates the brake devices such that the brake devices contact, and apply friction on, one or more of the gears to brake the gears and to prevent the gears from rotating. During the reverse torque condition, the output shaft transfers torque and power at a lower magnitude (e.g., about 150 horsepower) than the torque and the power during the normal operation. Thus, the torque is relatively low during the reverse torque condition relative to the torque during the normal operation, and the brake devices are able to brake the gears during the reverse torque condition. The gear brake system is a closed brake fluid circuit such that the brake fluid is recycled back to the brake fluid reservoir when the brake devices are unactuated.

Accordingly, the gear brake system of the present disclosure brakes or locks the gears to prevent rotation of the gears. With no rotation of the gears, the bearings do not require the lubricant. Thus, the gear brake system prevents bearing seizure during the reverse torque condition without having to supply lubricant to the bearings during the reverse torque condition. Therefore, the gear brake system of the present disclosure eliminates the need for an auxiliary lubrication system and reduces complexity of the lubrication system as compared to gearbox assemblies without the benefit of the present disclosure. Further, the closed brake fluid circuit placed within a single component (e.g., within the pin) reduces the possibility of a leak as compared to brake systems without the benefit of the present disclosure.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A extending parallel to the longitudinal centerline axis 12, a radial direction R that is normal to the axial direction A, and a circumferential direction C that extends arcuately about the longitudinal centerline axis 12.

In general, the turbine engine 10 includes a propulsor section 14 and a turbo-engine 16 disposed downstream from the propulsor section 14. The turbo-engine 16 includes, in serial flow relationship, a compressor section 21, a combustor 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low-pressure (LP) compressor 22 followed downstream by a high-pressure (HP) compressor 24. The combustor 26 is downstream of the compressor section 21. The turbine section 27 is downstream of the combustor 26 and includes a high-pressure (HP) turbine 28 followed downstream by a low-pressure (LP) turbine 30. The turbo-engine 16 further includes a jet exhaust nozzle section 32 that is downstream of the turbine section 27, a high-pressure (HP) shaft 34, and a low-pressure (LP) shaft 36. The HP shaft 34 drivingly connects the HP turbine 28 to the HP compressor 24, and the HP compressor 24, the HP turbine 28, and the HP shaft 34 are together referred to as an HP spool. The HP turbine 28 and the HP compressor 24 rotate in unison through the HP shaft 34. The LP shaft 36 drivingly connects the LP turbine 30 to the LP compressor 22, and the LP compressor 22, the LP turbine 30, and the LP shaft 36 are together referred to as an LP spool. The LP turbine 30 and the LP compressor 22 rotate in unison through the LP shaft 36. The compressor section 21, the combustor 26, the turbine section 27, and the jet exhaust nozzle section 32 together define a core air flow path.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In the embodiment of FIG. 1, the propulsor 38 is a fan that is driven by the turbo-engine 16. In some embodiments, the propulsor 38 is a propeller that is driven by the turbo-engine 16. The propulsor blades 40 extend outwardly from the disk 42 generally along the radial direction R. In the case of a variable pitch propulsor, the plurality of propulsor blades 40 is rotatable relative to the disk 42 about a pitch axis P by virtue of the propulsor blades 40 being operatively coupled to an actuation member 44 configured to collectively vary the pitch of the propulsor blades 40 in unison. The propulsor blades 40, the disk 42, and the actuation member 44 are together rotatable about the longitudinal centerline axis 12 via a propulsor shaft 45 that is powered by the LP shaft 36 across a power gearbox, also referred to as a gearbox assembly 46 (e.g., the turbine engine 10 is an indirect drive engine). In this way, the propulsor 38 is drivingly coupled to, and powered by, the turbo-engine 16. The gearbox assembly 46 is shown schematically in FIG. 1. The gearbox assembly 46 is a reduction gearbox assembly for adjusting the rotational speed of the propulsor shaft 45 and, thus, the propulsor 38 relative to the LP shaft 36 when power is transferred from the LP shaft 36 to the propulsor shaft 45.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular casing or a nacelle 50 that circumferentially surrounds the propulsor 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the propulsor section 14. As the volume of air 58 passes across the propulsor blades 40, a first portion of air, also referred to as bypass air 62, is directed into the bypass airflow passage 56. At the same time, a second portion of air, also referred to as core air 64, is directed into the upstream section of the core air flow path through the core inlet 20 of the LP compressor 22. The ratio between the bypass air 62 and the core air 64 is commonly known as a bypass ratio. The pressure of the core air 64 is then increased through the LP compressor 22, generating compressed air 65. The compressed air 65 is directed through the HP compressor 24, where the pressure of the compressed air 65 is further increased. The compressed air 65 is then directed into the combustor 26, where the compressed air 65 is mixed with fuel and ignited to generate combustion gases 66.

The combustion gases 66 are directed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 through the HP shaft 34 (self-sustaining cycle). In this way, the combustion gases 66 do work on the HP turbine 28. The combustion gases 66 are then directed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the propulsor 38 through the LP shaft 36 via the gearbox assembly 46. In this way, the combustion gases 66 do work on the LP turbine 30.

The combustion gases 66 are subsequently directed through the jet exhaust nozzle section 32 of the turbo-engine 16 to provide propulsive thrust. Simultaneously, the bypass air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2B:
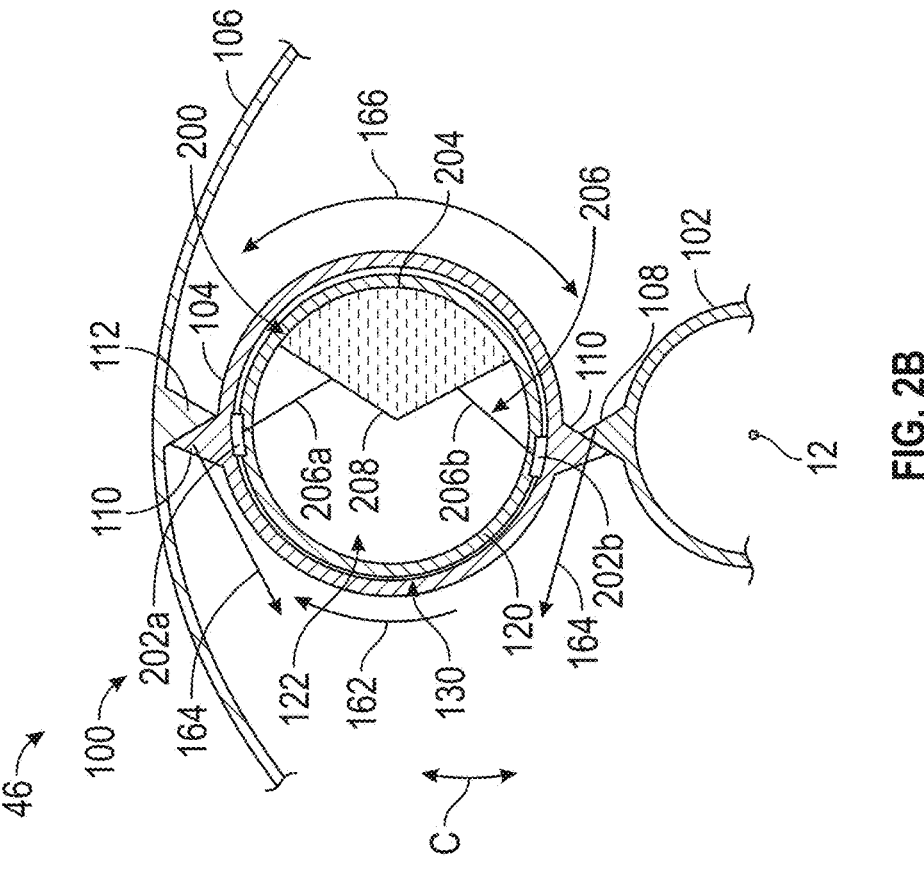
FIG. 2B is a schematic partial cross-sectional view of the gearbox assembly with the gear brake system in an actuated state, according to the present disclosure.
Figure 2A:
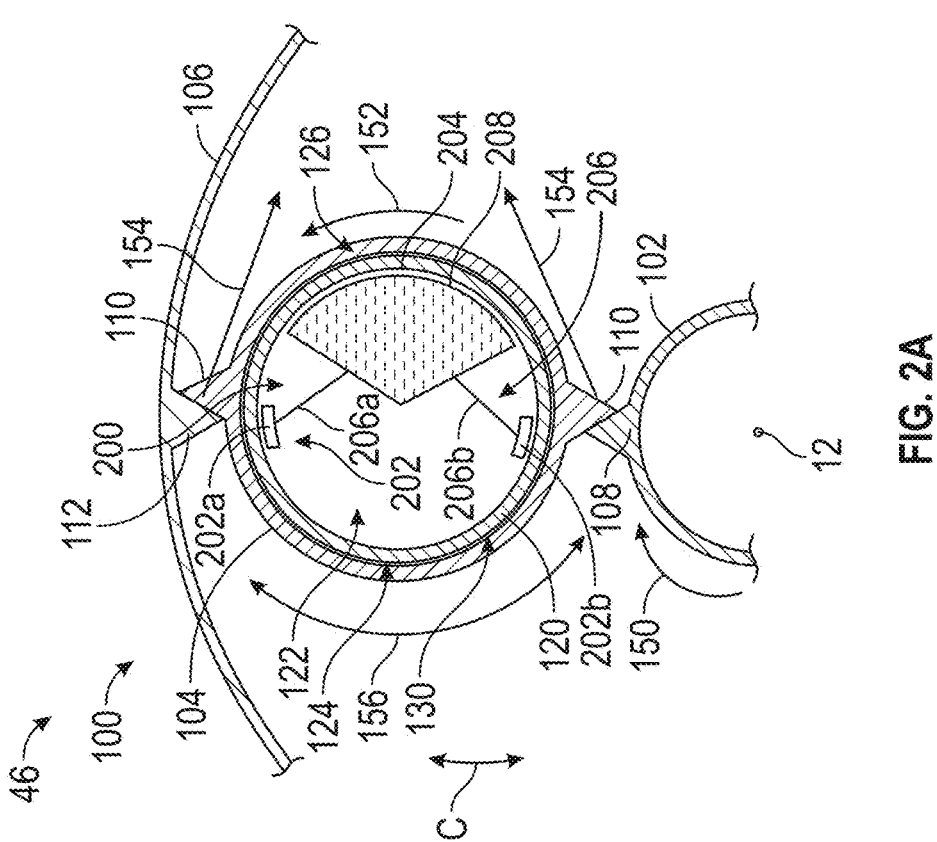
FIG. 2A is a schematic partial cross-sectional view of a gearbox assembly of the turbine engine of FIG. 1, taken along section line 2A-2A, and having a gear brake system in an unactuated state, according to the present disclosure.
Figure 2C:
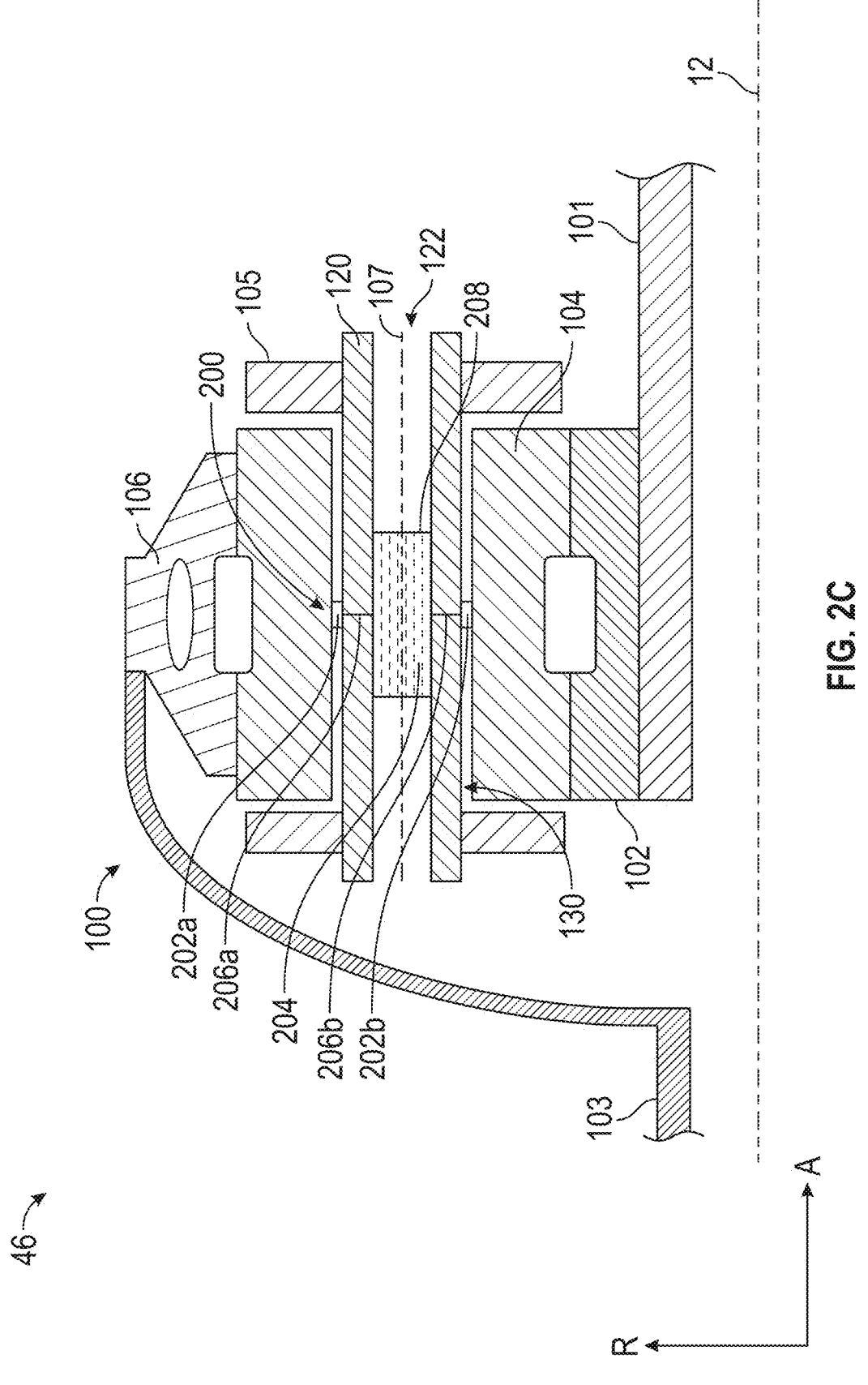
FIG. 2C is a schematic cross-sectional view of the gearbox assembly, taken at detail 2C in FIG. 1, and having the gear brake system in the actuated state, according to the present disclosure.

FIG. 2A is a schematic partial cross-sectional view of the gearbox assembly 46, taken along section line 2A-2A of FIG. 1, and having a gear brake system 200 in an unactuated state, according to the present disclosure. FIG. 2B is a schematic partial cross-sectional view of the gearbox assembly 46 with the gear brake system 200 in an actuated state, according to the present disclosure. FIG. 2C is a schematic cross-sectional view of the gearbox assembly 46, taken at detail 2C in FIG. 1, and having the gear brake system 200 in the actuated state, according to the present disclosure.

The gearbox assembly 46 includes a gear assembly 100, an input shaft 101 (FIG. 2C), and an output shaft 103 (FIG. 2C). The output shaft 103 is drivingly coupled to the input shaft 101 through the gear assembly 100. In the embodiment of FIGS. 1 to 2C, the input shaft 101 is the LP shaft 36 (FIG. 1) and the output shaft 103 is the propulsor shaft 45 (FIG. 1) such that the turbo-engine 16 (FIG. 1) drives the propulsor 38 (FIG. 1) through the gearbox assembly 46, as detailed above. In some embodiments, the gearbox assembly 46 can be utilized in applications other than turbine engines, such as, for example in automobiles, or the like. In such applications, the input shaft 101 can be coupled to a crankshaft of the automobile (e.g., via a flywheel therebetween) and the output shaft 103 can be a shaft of the automobile's transmission for providing power to the wheels of the automobile through the gearbox assembly.

The gear assembly 100 includes a plurality of gears 102, 104, and 106. The plurality of gears 102, 104, and 106 include a first gear 102, a second gear 104, and a third gear 106. In FIGS. 2A to 2C, the first gear 102 is a sun gear, the second gear 104 is a planet gear, and the third gear 106 is a ring gear. While one first gear 102, one second gear 104, and one third gear 106 are shown in FIGS. 2A to 2C, the gear assembly 100 can include one or more first gears 102, one or more second gears 104, and one or more third gears 106. The second gear 104 is constrained by a second gear carrier 105 (FIG. 2C).

The gear assembly 100 can be arranged as an epicyclic gear assembly. When the gear assembly 100 is an epicyclic gear assembly, the gear assembly 100 includes a plurality of second gears 104 (e.g., two or more second gears 104). In the epicyclic gear assembly, the gear assembly 100 can be in a star arrangement or a rotating ring gear type gear assembly (e.g., the third gear 106 is rotating about the longitudinal centerline axis 12 and the second gear carrier 105 is fixed and stationary). In such an arrangement, the output shaft 103 is driven by the third gear 106. For example, the third gear 106 is coupled to the propulsor shaft 45 (FIG. 1) such that rotation of the third gear 106 causes the propulsor shaft 45, and, thus, the propulsor 38, to rotate. In this way, the third gear 106 is an output of the gear assembly 100. However, other suitable types of gear assemblies may be employed. In one non-limiting embodiment, the gear assembly 100 is a planetary arrangement, in which the third gear 106 is held fixed, with the second gear carrier 105 (FIG. 2C) allowed to rotate. In such an arrangement, the output shaft 103 is driven by the second gear carrier 105. For example, the second gear carrier 105 is coupled to the propulsor shaft 45 such that rotation of the second gear carrier 105 causes the propulsor shaft 45, and, thus, the propulsor 38, to rotate. In this way, the second gear 104 (e.g., via the second gear carrier 105) is the output of the gear assembly 100. In another non-limiting embodiment, the gear assembly 100 may be a differential gear assembly in which the third gear 106 and the second gear carrier 105 are both allowed to rotate. While an epicyclic gear assembly is detailed herein, the gear assembly 100 can include any type of gear assembly including, for example, a compound gear assembly, a multiple stage gear assembly, or the like.

The first gear 102 includes a plurality of first gear teeth 108 (only one shown in FIGS. 2A and 2B). The plurality of first gear teeth 108 are disposed on an external surface of the first gear 102. The second gear 104 includes a plurality of second gear teeth 110 (only two shown in FIGS. 2A and 2B). The plurality of second gear teeth 110 are disposed on an external surface of the second gear 104. The third gear 106 includes a plurality of third gear teeth 112 (only one shown in FIGS. 2A and 2B). The plurality of third gear teeth 112 are disposed on an internal surface of the third gear 106. The plurality of first gear teeth 108, the plurality of second gear teeth 110, and the plurality of third gear teeth 112 can include spur gear teeth (e.g., gear teeth extending substantially parallel with a gear longitudinal centerline axis of the respective gear), helical gear teeth (e.g., gear teeth extending at a non-zero angle with respect to the gear longitudinal centerline axis), or the like.

The first gear 102 is coupled to the input shaft 101 (FIG. 2C) of the gearbox assembly 46 such that rotation of the input shaft 101 causes the first gear 102 to rotate. In particular, the first gear 102 is coupled to the LP shaft 36

(FIG. 1) such that rotation of the LP shaft 36 causes the first gear 102 to rotate. Radially outward of the first gear 102, and intermeshing therewith, is the second gear 104 that is supported by the second gear carrier 105. In particular, the plurality of second gear teeth 110 intermesh with the plurality of first gear teeth 108. The second gear carrier 105 supports and constrains the second gear 104 such that the second gear 104 is enabled to rotate about a second gear longitudinal centerline axis 107 (FIG. 2C) of the second gear 104 without rotating about the periphery of the first gear 102. Radially outwardly of the second gear 104, and intermeshing therewith, is the third gear 106, which is an annular ring gear. In particular, the plurality of third gear teeth 112 intermesh with the plurality of second gear teeth 110. The third gear 106 is coupled via the output shaft 103 (FIG. 2C) and rotates to drive rotation of the output shaft 103 about the longitudinal centerline axis 12. In particular, the third gear 106 is coupled via the propulsor shaft 45 (FIG. 1) to the propulsor 38 (FIG. 1) and rotates to drive rotation of the propulsor 38 about the longitudinal centerline axis 12.

The second gear 104 includes a second gear pin 120, about which the second gear 104 rotates. In particular, the second gear pin 120 is disposed within the second gear 104 and the second gear 104 rotates with respect to the second gear pin 120. The second gear pin 120 is hollow and defines a hollow interior 122. The second gear pin 120 is coupled with the second gear carrier 105 (FIG. 2C) such that the second gear pin 120 is a static component and is prevented from rotating about the second gear longitudinal centerline axis 107 (FIG. 2C). In this way, the second gear 104 is constrained by the second gear carrier 105.

The second gear 104 includes one or more second gear bearings 130 disposed therein. The one or more second gear bearings 130 enable the second gear 104 to rotate about the one or more second gear bearings 130 such that the second gear 104 rotates about the second gear longitudinal centerline axis 107 (FIG. 2C). The one or more second gear bearings 130 can include any type of bearing for a gear, such as, for example, journal bearings, roller bearings, or the like. In the embodiment of FIGS. 2A to 2C, the one or more second gear bearings 130 include a journal bearing defined between the second gear pin 120 and the second gear 104. For example, a lubricant (e.g., oil) is provided between the second gear pin 120 and the second gear 104 such that a lubricant film is formed between an outer surface of the second gear pin 120 and an inner surface of the second gear 104. The lubricant film maintains a space or a gap between the second gear 104 and the second gear pin 120 such that the second gear 104 rotates with respect to the second gear pin 120.

The second gear 104 and the second gear pin 120 may be viewed with respect to a "clock" orientation having a twelve o'clock position, a three o'clock position, a six o'clock position, and a nine o'clock position when viewed in the orientation of FIGS. 2A and 2B. Although not provided with reference numerals, the clock orientation is understood to include all clock positions therebetween. The twelve o'clock position is positioned at a top of the second gear 104 and the second gear pin 120, the three o'clock position is positioned ninety degrees (90°) from the twelve o'clock position, the six o'clock position is positioned at a bottom of the second gear 104 and the second gear pin 120 and is one hundred eighty degrees (180°) from the twelve o'clock position, and the nine o'clock position is positioned ninety degrees (90°) from the six o'clock position.

The second gear pin 120 includes a stiff portion 124 and a deformable portion 126. The stiff portion 124 has a greater stiffness than the deformable portion, and resists deformation when an operational load is applied on the second gear pin 120 during the normal operation of the gearbox assembly 46 (e.g., during the normal operation of the turbine engine 10), as detailed further below. The deformable portion 126 has a lesser stiffness than the stiff portion 124, and deforms when a reverse torque load is applied on the second gear pin 120 during the reverse torque condition of the gearbox assembly 46, as detailed further below. For example, the deformable portion 126 can have a lesser thickness than the stiff portion 124. In some embodiments, the deformable portion 126 is made of a material that has a lesser stiffness than a material of the stiff portion 124. For example, the deformable portion 126 can be made of a material having a lesser modulus of elasticity than the material of the stiff portion 124 of the second gear pin 120.

The stiff portion 124 is defined on a first side of the second gear pin 120 and the deformable portion 126 is defined on a second side of the second gear pin 120 that is opposite the first side. In particular, the stiff portion 124 is defined between the six o'clock position and the twelve o'clock position of the second gear pin 120 in a clockwise direction. The deformable portion 126 is defined between the twelve o'clock position and the six o'clock position of the second gear pin 120 in the clockwise direction. In this way, the stiff portion 124 is positioned generally at the nine o'clock position, and the deformable portion 126 is positioned generally at the three o'clock position. In some embodiments, the deformable portion 126 can include a gradient stiffness such that the stiffness of the second gear pin 120 decreases from the stiff portion 124 to the deformable portion 126. For example, the stiffness decreases from the twelve o'clock position and the six o'clock position to the three o'clock position of the second gear pin 120.

The gear brake system 200 includes one or more brake devices 202, a brake fluid reservoir 204, and one or more brake fluid lines 206. In FIGS. 2A to 2C, the one or more brake devices 202 are brake pads that apply friction against the second gear 104 when actuated to brake (e.g., to lock) the second gear 104 to prevent the second gear 104 from rotating, as detailed further below. The one or more brake devices 202 include a friction material that applies friction on the second gear 104 to brake the second gear 104. The friction material can include, for example, a rubber material, a ceramic material, composite materials, metallic materials, or the like. In the embodiment of FIGS. 2A to 2C, the one or more brake devices 202 include a first brake device 202a and a second brake device 202b. The first brake device 202a is positioned generally at a radially top portion of the second gear pin 120 (e.g., generally at the twelve o'clock position of the second gear pin 120). The second brake device 202b is positioned generally at a radially bottom portion of the second gear pin 120 (e.g., generally at the six o'clock position of the second gear pin 120). The gear brake system 200 actuates the one or more brake devices 202 to contact the second gear 104 and to prevent the second gear 104 from rotating, as detailed further below.

The brake fluid reservoir 204 stores a brake fluid 208 therein. The brake fluid is a hydraulic fluid, such as, for example, water, oil, mineral oil, a glycol-ether fluid, a silicone-based fluid, or the like. The brake fluid reservoir 204 is disposed within the second gear 104. In particular, the brake fluid reservoir 204 is disposed within the hollow interior 122 of the second gear pin 120. The brake fluid reservoir 204 is positioned within the second gear pin 120 generally at the deformable portion 126 of the second gear pin 120. In particular, the brake fluid reservoir 204 is positioned between the twelve o'clock position and the six o'clock position (e.g., generally at the three o'clock position) in the clockwise direction. The brake fluid reservoir 204 is positioned in the second gear pin 120 such that the second gear pin 120 (the deformable portion 126) contacts the brake fluid reservoir 204 during the reverse torque condition, as detailed further below. The brake fluid reservoir 204 is made of a deformable material and can include a thin wall such that the brake fluid is directed out of the brake fluid reservoir when the brake fluid reservoir deforms. The thin wall of the brake fluid reservoir 204 is in fluid communication with the one or more brake fluid lines 206. In some embodiments, the gear brake system 200 includes one or more valves (e.g., check valves, or the like) in fluid communication with the brake fluid reservoir 204 and the one or more brake fluid lines 206 such that the brake fluid is directed into the one or more brake fluid lines 206 through the one or more valves when the brake fluid reservoir 204 is deformed.

The one or more brake fluid lines 206 are in fluid communication with the one or more brake devices 202 and the brake fluid reservoir 204. In this way, the one or more brake fluid lines 206 direct the brake fluid from the brake fluid reservoir 204 to the one or more brake devices 202 to actuate the one or more brake devices 202, as detailed further below. The one or more brake fluid lines 206 include a first brake fluid line 206a and a second brake fluid line 206b. The first brake fluid line 206a is in fluid communication with the first brake device 202a. The second brake fluid line 206b is in fluid communication with the second brake device 202b.

During the normal operation of the gearbox assembly 46 (e.g., of the turbine engine 10 of FIG. 1), the input shaft 101 (FIG. 2C) rotates and transfers power to the output shaft 103 (FIG. 2C) through the gearbox assembly 46. In particular, the LP shaft 36 (FIG. 1) rotates and transfers power to the propulsor shaft 45 (FIG. 1) through the gearbox assembly 46 to rotate the propulsor 38 (FIG. 1), as detailed above with respect to FIG. 1. With reference to FIG. 2A, during the normal operation, the gear brake system 200 is unactuated such that the one or more brake devices 202 are spaced from the second gear 104 and are prevented from contacting the second gear 104 (e.g., the gear assembly 100 is unlocked). This allows the plurality of gears 102, 104, and 106 of the gear assembly 100 to rotate during the normal operation. The first gear 102 rotates in a first gear operational rotational direction 150. As the first gear 102 rotates, the plurality of first gear teeth 108 intermesh with the plurality of second gear teeth 110, thereby reacting against the plurality of first gear teeth 108. This causes torque to be transferred from the first gear 102 to the second gear 104, thereby rotating the second gear 104 in a second gear operational rotational direction 152. The second gear operational rotational direction 152 is opposite the first gear operational rotational direction 150. At the same time, the plurality of second gear teeth 110 intermesh with the plurality of third gear teeth 112, thereby reacting against the plurality of third gear teeth 112.

In the star arrangement of the gear assembly 100, this causes the torque to be transferred from the second gear 104 to the third gear 106, thereby rotating the third gear 106 and the output shaft 103 (FIG. 2C). For example, the third gear 106 rotates the propulsor shaft 45 (FIG. 1), thereby causing the propulsor 38 (FIG. 1) to rotate. In the planetary arrangement of the gear assembly 100, the second gear 104 rotates about the longitudinal centerline axis 12 and the third gear 106 is stationary such that the third gear 106 applies a reaction torque against the second gear 104. In this way, the second gear 104 rotates the output shaft 103 via the second gear carrier 105 (FIG. 2C). For example, the second gear 104 (via the second gear carrier 105) rotates the propulsor shaft 45, thereby causing the propulsor 38 to rotate.

The intermeshing of the plurality of second gear teeth 110 with the plurality of first gear teeth 108 and the plurality of third gear teeth 112 applies a gear teeth operational load 154 on the plurality of second gear teeth 110 in a first gear teeth load direction. As the second gear 104 rotates, the second gear 104 applies a second gear operational load 156 on the second gear pin 120. The second gear 104 applies the second gear operational load 156 on the stiff portion 124 of the second gear pin 120. The stiff portion 124 prevents the second gear pin 120 from deforming under the second gear operational load 156. Accordingly, the second gear pin 120 is prevented from contacting the brake fluid reservoir 204 during the normal operation. In this way, the gear brake system 200 is prevented from actuating the one or more brake devices 202 and braking the second gear 104, and, thus, the output shaft 103, during the normal operation. For example, the LP shaft 36 rotates the propulsor shaft 45 through the gearbox assembly 46 and torque is transferred from the LP shaft 36 to the propulsor shaft 45 to rotate the propulsor 38 during the normal operation.

With reference to FIGS. 2B and 2C, during a reverse torque condition (e.g., during windmilling), the torque is transferred from the output shaft 103 (FIG. 2C) to the input shaft 101 (FIG. 2C) through the gearbox assembly 46. For example, the windmilling causes the propulsor 38 (FIG. 1) to rotate, thereby rotating the output shaft 103 (e.g., the propulsor shaft 45). In this way, the torque transfer through the gearbox assembly 46 is in an opposite direction as to the torque transfer during the normal operation. To prevent the plurality of gears 102, 104, and 106 from rotating, the present disclosure provides for a method of braking the gear assembly 100 by actuating the one or more brake devices 202 to brake the gear assembly 100 during the reverse torque condition, as detailed further below. During the reverse torque condition, the second gear 104 tends to rotate in a second gear reverse torque rotational direction 162 that is opposite the second gear operational rotational direction 152 (FIG. 2A).

The intermeshing of the plurality of second gear teeth 110 with the plurality of first gear teeth 108 and the plurality of third gear teeth 112 applies a gear teeth reverse torque load 164 on the plurality of second gear teeth 110 in a second gear teeth load direction that is opposite the first gear teeth load direction. As the second gear 104 tends to rotate, the second gear 104 applies a second gear reverse torque load 166 on the second gear pin 120. The second gear 104 applies the second gear reverse torque load 166 on the deformable portion 126 of the second gear pin 120. In this way, the second gear pin 120 deforms under the second gear reverse torque load 166. In other words, the second gear 104 squeezes the second gear pin 120 during the reverse torque condition. Accordingly, the second gear pin 120 contacts and applies a force on the brake fluid reservoir 204 during the reverse torque condition. The force causes the brake fluid reservoir 204 to deform such that the brake fluid is directed out of the brake fluid reservoir 204 and into the one or more brake fluid lines 206. The one or more brake fluid lines 206 direct the brake fluid to the one or more brake devices 202 to actuate the one or more brake devices 202 to contact the second gear 104. In this way, the gear brake system 200 actuates the one or more brake devices 202 and brakes the second gear 104, and, thus, the output shaft 103, during the reverse torque condition to prevent the output shaft 103 from rotating during the reverse torque condition. Thus, the gear assembly 100 is braked and locked during the reverse torque condition. In particular, the torque is transferred from the propulsor 38 to the gear assembly 100 (e.g., the second gear 104) through the propulsor shaft 45 during the reverse torque condition (e.g., as the propulsor 38 is windmilling), and the gear brake system 200 actuates the one or more brake devices 202 to prevent the propulsor shaft 45 from rotating (e.g., the plurality of gears 102, 104, and 106 of the gear assembly 100 are prevented from rotating).

In embodiments that include a plurality of second gears 104, one or more of the plurality of second gears 104 can include a respective gear brake system 200 disposed therein based on the braking force needed for a particular gear assembly. In the embodiment of FIGS. 2B to 2C, the one or more brake devices 202 move generally radially to contact an inner surface of the second gear 104 to brake (lock) the second gear 104 and prevent the second gear 104 from rotating. In some embodiments, the one or more brake devices 202 can move axially to brake (lock) the second gear 104, as detailed further below with respect to FIG. 3.

Figure 3:
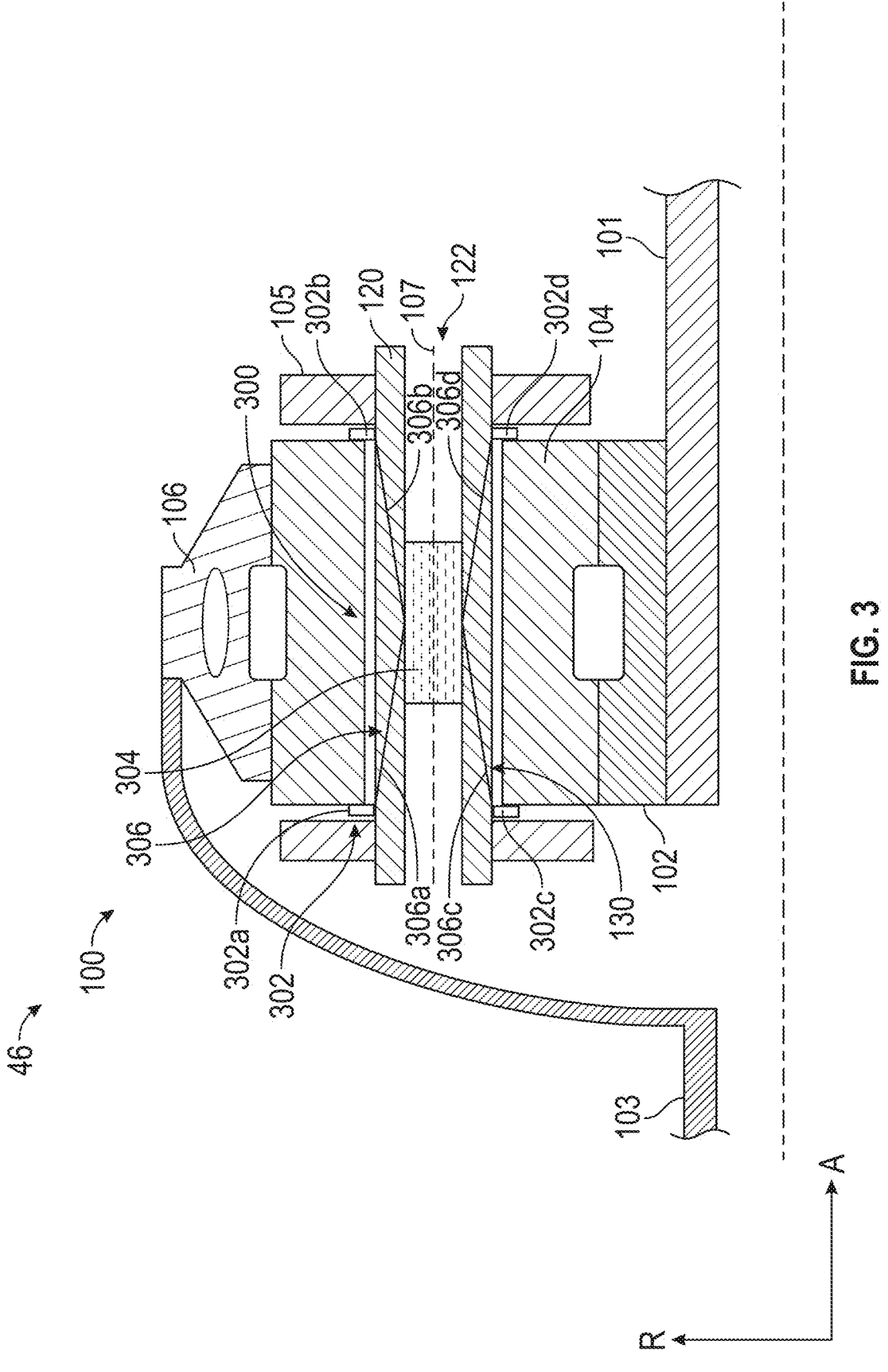
FIG. 3 is a schematic cross-sectional view of the gearbox assembly having a gear brake system in an actuated state, according to another embodiment.

FIG. 3 is a schematic cross-sectional view of the gearbox assembly 46 having a gear brake system 300 in an actuated state, according to another embodiment. The gear brake system 300 includes one or more brake devices 302, a brake fluid reservoir 304, and one or more brake fluid lines 306. The one or more brake devices 302, the brake fluid reservoir 304, and the one or more brake fluid lines 306 are substantially similar to the one or more brake devices 202, the brake fluid reservoir 204, and the one or more brake fluid lines 206, respectively, of FIGS. 2A to 2C. The one or more brake devices 302 include a first brake device 302a and a second brake device 302b. The first brake device 302a and the second brake device 302b are positioned to actuate substantially axially when the gear brake system 300 is actuated. In FIG. 3, the first brake device 302a and the second brake device 302b are positioned on a top portion of the second gear pin 120. The first brake device 302a is positioned at an axially forward surface of the second gear 104. The second brake device 302b is positioned at an axially aft surface of the second gear 104. The one or more brake fluid lines 306 include a first brake fluid line 306a and a second brake fluid line 306b. The first brake fluid line 306a is in fluid communication with the brake fluid reservoir 304 and the first brake device 302a. The second brake fluid line 306b is in fluid communication with the brake fluid reservoir 304 and the second brake device 302b.

The one or more brake devices 302 can also include a third brake device 302c and a fourth brake device 302d. The third brake device 302c and the fourth brake device 302d are positioned to actuate substantially axially when the gear brake system 300 is actuated. In FIG. 3, the third brake device 302c and the fourth brake device 302d are positioned on a bottom portion of the second gear pin 120. The third brake device 302c is positioned at the axially forward surface of the second gear 104. The fourth brake device 302d is positioned at the axially aft surface of the second gear 104. The one or more brake fluid lines 306 also include a third brake fluid line 306c and a fourth brake fluid line 306d. The third brake fluid line 306c is in fluid communication with the brake fluid reservoir 304 and the third brake device 302c. The fourth brake fluid line 306d is in fluid communication with the brake fluid reservoir and the fourth brake device 302d.

The gear brake system 300 operates substantially similarly as does the gear brake system 200 of FIG. 2. However, when the gear brake system 300 is actuated (as in FIG. 3), the one or more brake devices 302 move substantially axially, rather than substantially radially (as in FIG. 2C). In particular, the first brake device 302a moves axially aftward to contact the second gear 104, and the second brake device 302b moves axially forward to contact the second gear 104. Likewise, the third brake device 302c moves axially aftward to contact the second gear 104, and the fourth brake device 302d moves axially forward to contact the second gear 104. In this way, the one or more brake devices 302 are actuated to brake the second gear 104, and, thus, the output shaft 103 to prevent the output shaft 103 from rotating during the reverse torque condition. During the normal operation, the one or more brake devices 302 are spaced axially from the second gear 104 such that the second gear 104, and, thus, the output shaft 103, is allowed to rotate.

Accordingly, the gear brake systems 200 and 300 brake or lock the gears 102, 104, and 106 to prevent rotation of the gears 102, 104, and 106 during the reverse torque condition. With no rotation of the gears 102, 104, and 106, the second gear bearings 130, and the gears 102, 104, and 106, do not require lubricant. Thus, the gear brake systems 200 and 300 prevent bearing seizure of the second gear bearings 130 during the reverse torque condition without having to supply lubricant to the second gear bearings 130 during the reverse torque condition. Therefore, the gear brake systems 200 and 300 eliminate the need for an auxiliary lubrication system and reduce complexity of the lubrication system as compared to gearbox assemblies without the benefit of the present disclosure. Further, the closed brake fluid circuit placed within a single component (e.g., within second gear 104) reduces the possibility of a leak as compared to brake systems without the benefit of the present disclosure due to not having to have brake fluid lines from outside of the gear assembly.

Further aspects of the present disclosure are provided by the subject matter of the following clauses.

A gearbox assembly comprises a gear assembly, an input shaft coupled to the gear assembly, an output shaft drivingly coupled to the input shaft through the gear assembly, and a gear brake system disposed within the gear assembly and comprising one or more brake devices, the gear brake system actuating the one or more brake devices to brake the gear assembly during a reverse torque condition of the gearbox assembly.

The gearbox assembly of the preceding clause, the reverse torque condition being when torque is transferred from the output shaft to the input shaft through the gear assembly.

The gearbox assembly of any preceding clause, the gear brake system comprising a brake fluid reservoir that stores brake fluid therein, and the gear brake system supplies the brake fluid from the brake fluid reservoir to the one or more brake devices to actuate the one or more brake devices during the reverse torque condition.

The gearbox assembly of any preceding clause, the gear brake system comprising one or more brake fluid lines in fluid communication with the brake fluid reservoir and the one or more brake devices, and the brake fluid lines direct the brake fluid from the brake fluid reservoir to the one or more brake devices during the reverse torque condition.

The gearbox assembly of any preceding clause, the gear assembly comprising a first gear and a second gear that intermeshes with the first gear, and the brake fluid reservoir is disposed within the second gear.

The gearbox assembly of any preceding clause, the one or more brake devices being spaced from the second gear during normal operation of the gearbox assembly, and the gear brake system actuates the one or more brake devices such that the one or more brake devices contact the second gear to brake the gear assembly during the reverse torque condition.

The gearbox assembly of any preceding clause, the second gear including a second gear pin about which the second gear rotates, and the brake fluid reservoir is disposed within the second gear pin.

The gearbox assembly of any preceding clause, the second gear pin being deformable and deforms during the reverse torque condition such that the second gear pin squeezes the brake fluid reservoir and forces the brake fluid out of the brake fluid reservoir to supply the brake fluid to the one or more brake devices.

The gearbox assembly of any preceding clause, the second gear pin including a deformable portion, and the brake fluid reservoir is positioned within the second gear pin at the deformable portion.

The gearbox assembly of any preceding clause, the second gear pin including a stiff portion, and the deformable portion has a lesser stiffness than the stiff portion.

The gearbox assembly of any preceding clause, the gear assembly including a plurality of gears including the first gear and the second gear.

The gearbox assembly of any preceding clause, the gear assembly including a third gear.

The gearbox assembly of the preceding clause, the first gear being a sun gear, the second gear is a planet gear, and the third gear is a ring gear.

The gearbox assembly of any preceding clause, the second gear being constrained by a second gear carrier.

The gearbox assembly of any preceding clause, the gear assembly including a plurality of second gears.

The gearbox assembly of any preceding clause, the first gear including a plurality of first gear teeth.

The gearbox assembly of any preceding clause, the second gear including a plurality of second gear teeth.

The gearbox assembly of any preceding clause, the third gear including a plurality of third gear teeth.

The gearbox assembly of any preceding clause, the plurality of second gear teeth intermeshing with the plurality of first gear teeth.

The gearbox assembly of any preceding clause, the plurality of third gear teeth intermeshing with the plurality of third gear teeth.

The gearbox assembly of any preceding clause, the input shaft being coupled to the first gear.

The gearbox assembly of any preceding clause, the output shaft being coupled to third gear.

The gearbox assembly of any preceding clause, the output shaft being coupled to the second gear carrier.

The gearbox assembly of any preceding clause, the input shaft being a low-pressure shaft of a turbo-engine of a turbine engine.

The gearbox assembly of any preceding clause, the output shaft being a propulsor shaft of a propulsor of the turbine engine.

The gearbox assembly of any preceding clause, the second gear including one or more second gear bearings disposed therein, the one or more second bearings allowing the second gear to rotate about a second gear longitudinal centerline axis.

The gearbox assembly of any preceding clause, the one or more bearings being journal bearings.

The gearbox assembly of any preceding clause, the journal bearings being defined between the second gear pin and the second gear.

The gearbox assembly of any preceding clause, the second gear deforming and applying a reverse torque load during the reverse torque condition.

The gearbox assembly of any preceding clause, the stiff portion being defined on a first side of the second gear pin.

The gearbox assembly of any preceding clause, the deformable portion being defined on a second side of the second gear pin that is opposite the first side.

The gearbox assembly of any preceding clause, the first side being a side of the second gear pin on which the second gear applies an operational load during the normal operation of the gearbox assembly.

The gearbox assembly of any preceding clause, the second side being a side of the second gear pin on which the second gear applies the reverse torque load during the reverse torque condition.

The gearbox assembly of any preceding clause, the one or more brake devices being brake pads.

The gearbox assembly of any preceding clause, the one or more brake devices applying friction against the second gear to brake the second gear.

The gearbox assembly of any preceding clause, the one or more brake devices including a first brake device and a second brake device.

The gearbox assembly of any preceding clause, the first brake device being positioned at a radially top portion of the second gear pin.

The gearbox assembly of any preceding clause, the second brake device being positioned at a radially bottom portion of the second gear pin.

The gearbox assembly of any preceding clause, the one or more brake devices moving generally radially outward to contact the second gear during the reverse torque condition.

The gearbox assembly of any preceding clause, the one or more brake devices moving generally axially to contact the second gear during the reverse torque condition.

The gearbox assembly of any preceding clause, the first brake device moving axially forward and the second brake device moves axially aftward to contact the second gear.

The gearbox assembly of any preceding clause, the one or more brake devices including a third brake device and a fourth brake device, the first brake device and the second brake device are positioned at a top portion of the second gear pin, and the third brake device and the fourth brake device are positioned at a bottom portion of the second gear pin.

A method of braking a gear assembly of a gearbox assembly, the gearbox assembly comprising an input shaft, an output shaft drivingly coupled to the input shaft through the gear assembly, and a gear brake system disposed within the gear assembly and including one or more brake devices, the method comprising actuating the one or more brake devices to brake the gear assembly during a reverse torque condition of the gearbox assembly.

The method of any preceding clause, the reverse torque condition being when torque is transferred from the output shaft to the input shaft through the gear assembly.

The method of any preceding clause, the gear brake system comprising a brake fluid reservoir that stores brake fluid therein, and the method further comprises supplying the brake fluid from the brake fluid reservoir to the one or more brake devices to actuate the one or more brake devices during the reverse torque condition.

The method of any preceding clause, the gear brake system comprising one or more brake fluid lines in fluid communication with the brake fluid reservoir and the one or more brake devices, and the method further comprises directing the brake fluid from the brake fluid reservoir to the one or more brake devices through the one or more brake fluid lines during the reverse torque condition.

The method of any preceding clause, the gear assembly comprising a first gear and a second gear that intermeshes with the first gear, and the brake fluid reservoir is disposed within the second gear.

The method of any preceding clause, the one or more brake devices being spaced from the second gear during normal operation of the gearbox assembly, and the method further comprises actuating the one or more brake devices such that the one or more brake devices contact the second gear to brake the gear assembly during the reverse torque condition.

The method of any preceding clause, the second gear including a second gear pin about which the second gear rotates, and the brake fluid reservoir is disposed within the second gear pin.

The method of any preceding clause, the second gear pin being deformable, and the method further comprises deforming the second gear pin during the reverse torque condition such that the second gear pin squeezes the brake fluid reservoir and forces the brake fluid out of the brake fluid reservoir to supply the brake fluid to the one or more brake devices.

The method of any preceding clause, the second gear pin including a deformable portion, and the brake fluid reservoir is positioned within the second gear pin at the deformable portion.

The method of any preceding clause, the second gear pin including a stiff portion, and the deformable portion has a lesser stiffness than the stiff portion.

The method of any preceding clause, the gearbox assembly including the gearbox assembly of any preceding clause.

The method of any preceding clause, further comprising transferring torque from the input shaft to the output shaft through the gear assembly during normal operation of the gearbox assembly such that the input shaft causes the output shaft to rotate.

The method of any preceding clause, further comprising preventing the one or more brake devices from contacting the gear assembly during the normal operation of the gearbox assembly.

The method of any preceding clause, further comprising transferring torque from the output shaft to the input shaft through the gearbox assembly during the reverse torque condition.

The method of any preceding clause, the reverse torque condition occurring when a propulsor of the turbine engine is windmilling.

The method of any preceding clause, the torque transfer during the reverse torque condition being in an opposite direction as to the torque transfer during the normal operation of the gearbox assembly.

The method of any preceding clause, further comprising applying, with the plurality of first gear teeth or the plurality of third gear teeth, a gear teeth reverse torque load on the plurality of second gear teeth during the reverse torque condition.

The method of any preceding clause, further comprising applying, by the second gear, a second gear reverse torque load on the second gear pin during the reverse torque condition.

The method of any preceding clause, further comprising deforming the second gear pin by the second gear reverse torque load.

The method of any preceding clause, further comprising deforming the brake fluid reservoir by the second gear pin during the reverse torque condition.

The method of any preceding clause, the one or more brake devices being brake pads.

The method of any preceding clause, further comprising supplying the brake fluid from the brake fluid reservoir to the one or more brake devices when the second gear pin deforms during the reverse torque condition.

The method of any preceding clause, further comprising moving the one or more brake devices generally radially to contact the second gear to brake the gear assembly during the reverse torque condition.

The method of any preceding clause, further comprising moving the one or more brake devices generally axially to contact the second gear to brake the gear assembly during the reverse torque condition.

The method of any preceding clause, further comprising moving the first brake device axially forward and moving the second brake device axially aftward to brake the second gear during the reverse torque condition.

A turbine engine comprising a turbo-engine having a low-pressure shaft, a propulsor having a propulsor shaft, and a gearbox assembly. The gearbox assembly comprises a gear assembly, the propulsor shaft being coupled to the low-pressure shaft through the gear assembly, and a gear brake system disposed within the gear assembly and comprising one or more brake devices, the gear brake system actuating the one or more brake devices to brake the gear assembly during a reverse torque condition of the gearbox assembly.

The turbine engine of the preceding clause, the gearbox assembly being the gearbox assembly of any preceding clause.

A method of operating the turbine engine of any preceding clause, the method comprising transferring torque from the propulsor shaft to the gear assembly during a reverse torque condition, and actuating, via the torque, the one or more brake devices to brake the gear assembly during the reverse torque condition of the gearbox assembly.

The method of the preceding clause, the method including the method of braking the gear assembly of the gearbox assembly of any preceding clause.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gearbox assembly comprising:

a gear assembly comprising a first gear and a second gear that intermeshes with the first gear, the second gear including a gear pin about which the second gear rotates, the gear pin being deformable;

an input shaft coupled to the gear assembly;

an output shaft drivingly coupled to the input shaft through the gear assembly; and a gear brake system disposed within the gear assembly, the gear brake system comprising:

a brake fluid reservoir disposed within the gear pin, the brake fluid reservoir storing brake fluid therein; and one or more brake devices to brake the gear assembly, wherein, during a reverse torque condition of the gearbox assembly, the gear pin deforms and the gear pin squeezes the brake fluid reservoir to force the brake fluid out of the brake fluid reservoir and the gear brake system supplies the brake fluid from the brake fluid reservoir to the one or more brake devices and actuates the one or more brake devices to brake the gear assembly.

2. The gearbox assembly of claim 1, wherein the reverse torque condition is when torque is transferred from the output shaft to the input shaft through the gear assembly.

3. The gearbox assembly of claim 1, wherein the gear brake system further comprises one or more brake fluid lines in fluid communication with the brake fluid reservoir and the one or more brake devices, the one or more brake fluid lines directing the brake fluid from the brake fluid reservoir to the one or more brake devices during the reverse torque condition.

4. The gearbox assembly of claim 1, wherein the one or more brake devices are spaced from the second gear during normal operation of the gearbox assembly, and the gear brake system actuates the one or more brake devices such that the one or more brake devices contact the second gear to brake the gear assembly during the reverse torque condition.

5. The gearbox assembly of claim 1, wherein the gear pin includes a deformable portion, and the brake fluid reservoir is positioned within the gear pin at the deformable portion.

6. The gearbox assembly of claim 5, wherein the gear pin includes a stiff portion, and the deformable portion has a lesser stiffness than the stiff portion.

7. The gearbox assembly of claim 1, wherein the input shaft is coupled to the first gear.

8. The gearbox assembly of claim 1, wherein the gear assembly includes a plurality of gears including the first gear and the second gear.

9. The gearbox assembly of claim 8, wherein the gear assembly includes a third gear.

10. The gearbox assembly of claim 9, wherein the first gear is a sun gear, the second gear is a planet gear, and the third gear is a ring gear.

11. A method of braking a gear assembly of a gearbox assembly, the gearbox assembly comprising a first gear and a second gear that intermeshes with the first gear, the second gear including a gear pin about which the second gear rotates, the gear pin being deformable, an input shaft, an output shaft drivingly coupled to the input shaft through the gear assembly, and a gear brake system disposed within the gear assembly and including one or more brake devices to brake the gear assembly and a brake fluid reservoir disposed in the gear pin to store brake fluid therein, the method comprising:

deforming the gear pin during a reverse torque condition of the gearbox assembly such that the gear pin squeezes the brake fluid reservoir and forces the brake fluid out of the brake fluid reservoir;

supplying brake fluid from the brake fluid reservoir to the one or more brake devices; and actuating the one or more brake devices with the supplied brake fluid to brake the gear assembly.

12. The method of claim 11, wherein the reverse torque condition is when torque is transferred from the output shaft to the input shaft through the gear assembly.

13. The method of claim 11, wherein the gear brake system further comprises one or more brake fluid lines in fluid communication with the brake fluid reservoir and the one or more brake devices, and the method further comprises directing the brake fluid from the brake fluid reservoir to the one or more brake devices through the one or more brake fluid lines during the reverse torque condition.

14. The method of claim 11, wherein the one or more brake devices are spaced from the second gear during normal operation of the gearbox assembly, and the method further comprises actuating the one or more brake devices such that the one or more brake devices contact the second gear to brake the gear assembly during the reverse torque condition.

15. The method of claim 11, wherein the gear pin includes a deformable portion, and the brake fluid reservoir is positioned within the gear pin at the deformable portion.

16. The method of claim 15, wherein the gear pin includes a stiff portion, and the deformable portion has a lesser stiffness than the stiff portion.

17. The method of claim 11, wherein transferring torque from the input shaft to the output shaft through the gear assembly during normal operation of the gearbox assembly such that the input shaft causes the output shaft to rotate.

18. The method of claim 11, further comprising moving the one or more brake devices generally axially to contact the second gear to brake the gear assembly during the reverse torque condition.

19. The method of claim 11, further comprising moving the one or more brake devices generally radially to contact the second gear to brake the gear assembly during the reverse torque condition.

20. The method of claim 11, wherein the one or more brake devices are brake pads.

* * * * *